United States Patent
Shaffer

[11] 3,831,968
[45] Aug. 27, 1974

[54] PRESSURE CONTROL VALVE DEVICE WITH A TWO-POSITION CAM ACTUATOR FOR CONTROLLING PRESSURE IN A VEHICLE AIR SPRING

[75] Inventor: Ronald J. Shaffer, Pittsburgh, Pa.
[73] Assignee: Westinghouse Air Brake Company, Wilmerding, Pa.
[22] Filed: July 30, 1973
[21] Appl. No.: 383,908

[52] U.S. Cl. .......................... 280/124 F, 267/64 R
[51] Int. Cl. ............................................ B60g 17/00
[58] Field of Search ............... 267/64 R; 280/124 F

[56] References Cited
UNITED STATES PATENTS
| | | | |
|---|---|---|---|
| 2,893,752 | 7/1959 | May | 280/124 F |
| 3,058,739 | 10/1962 | Dickinson | 280/124 F |
| 3,157,413 | 11/1964 | Alflieri | 280/124 F |

Primary Examiner—James B. Marbert
Attorney, Agent, or Firm—W. F. Poore; R. W. McIntire, Jr.

[57] ABSTRACT

This invention relates to a cam-actuated control valve device for so controlling pressure of fluid in an air spring for interposition between a sprung portion and an unsprung portion of a vehicle as to support the sprung portion at a substantially constant preselected height relative to the unsprung portion irrespective of the load carried by the sprung portion.

A supply valve and a release valve are operated by a cam to supply fluid under pressure to or release of fluid under pressure from the air spring accordingly as the cam is rocked in one direction or in an opposite direction from either one of a pair of neutral positions. The cam is moved from one neutral position to a second neutral position by a fluid motor subject to a brake applying fluid pressure whereby, in the absence of such pressure, limited arcuate or rocking movement of the cam in either direction from its one or corresponding neutral position, resulting from movement of the sprung portion relative to the unsprung portion in response to the shocks, jolts, vertical movement and sidewise rocking experienced by the body or sprung portion of the vehicle while traveling at high speed, is obtainable without effecting operation of either valve to change the pressure in the air spring. On the other hand, upon the supply of the brake applying fluid pressure to the fluid motor, the cam is so positioned in its second neutral position that any degree of rocking in either direction from this second neutral position causes a change in the pressure in the air spring that is proportional to this degree of rocking.

10 Claims, 5 Drawing Figures

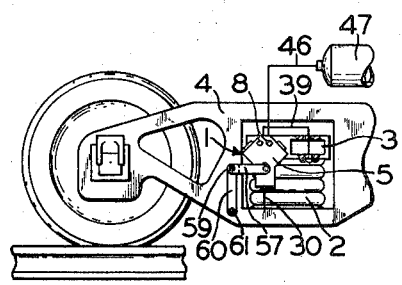
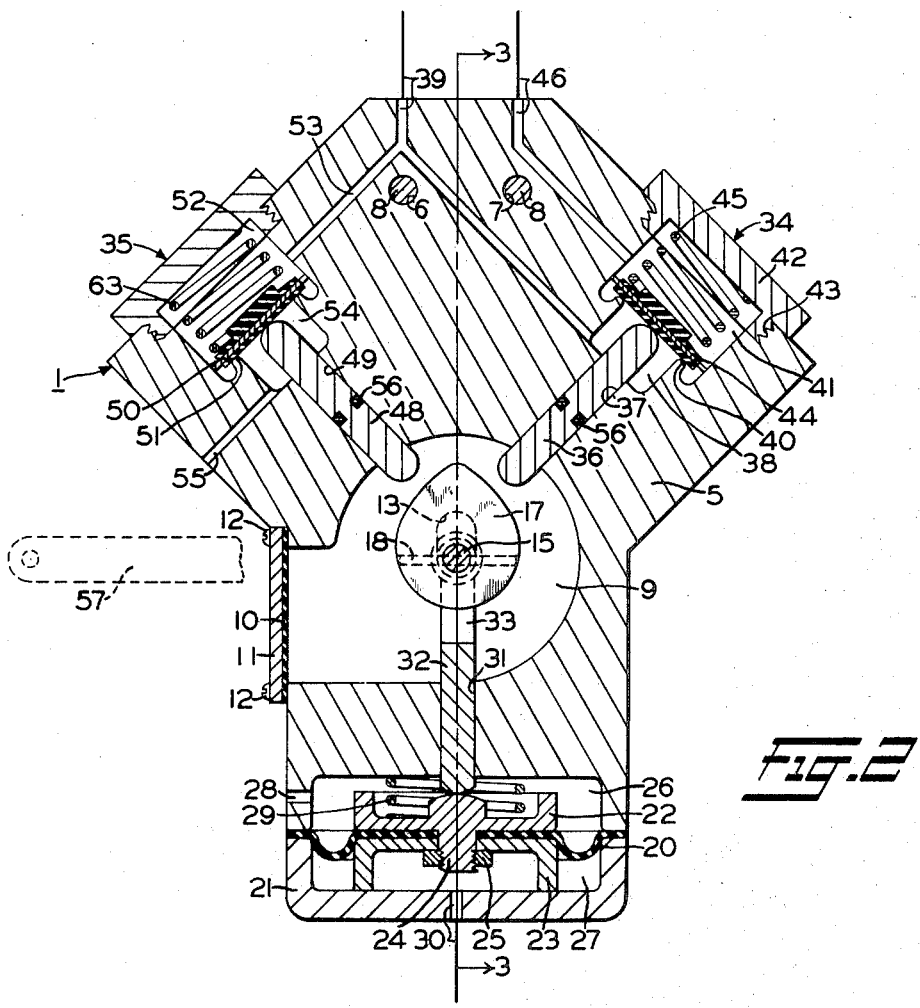

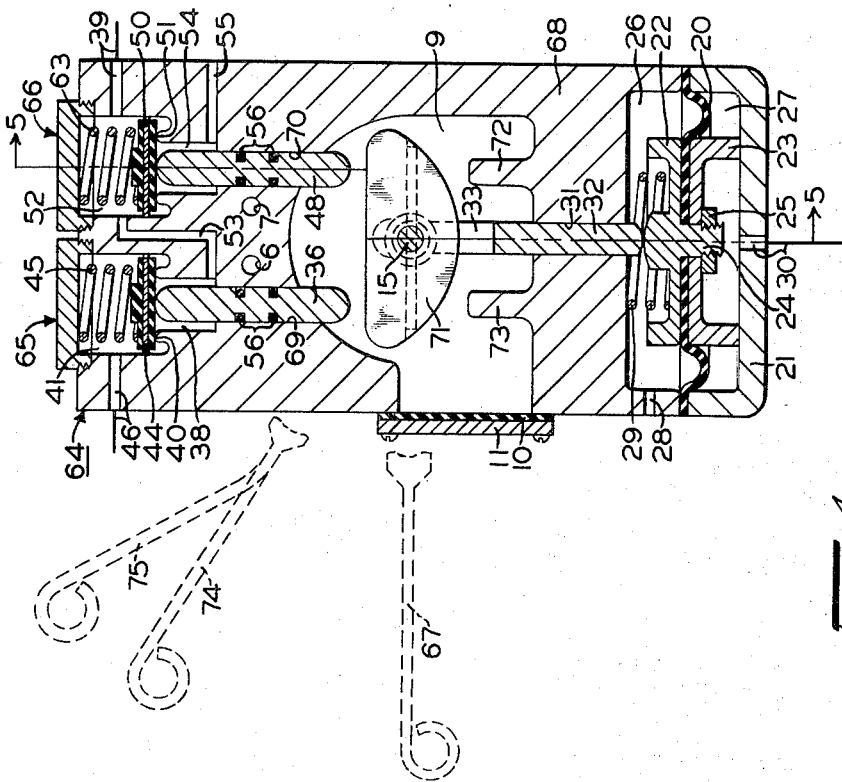
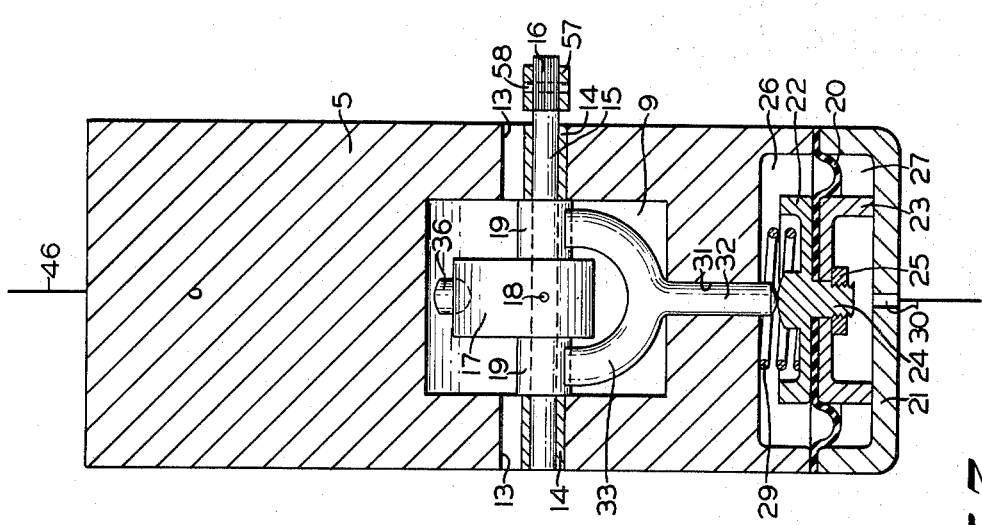
Fig. 3
Fig. 4

PRESSURE CONTROL VALVE DEVICE WITH A TWO-POSITION CAM ACTUATOR FOR CONTROLLING PRESSURE IN A VEHICLE AIR SPRING

BACKGROUND OF THE INVENTION

In U.S. Pat. No. 2,893,752 issued July 7, 1959 to Harry C. May, and assigned to the assignee of the present invention, there is shown and described a control valve device for so controlling pressure of fluid in an air spring interposed between a sprung portion and an unsprung portion of a vehicle as to support the sprung portion at a substantially constant preselected height relative to the unsprung portion irrespective of the load carried by the sprung portion. This control valve device embodies a cam member that is rocked to cause operation of a spool-type valve that controls the supply of fluid under pressure to or the release of fluid under pressure from an air spring in response to movement in excess of a chosen amount of the sprung portion, or bolster to which the control valve device is secured, relative to the unsprung portion, or truck side frame, irrespective of whether or not the brakes on the vehicle are applied or released. Consequently, this control valve device is not responsive to the initial and often small changes in load effected by such as the boarding or detraining of passengers while the vehicle is stopped.

Accordingly, it is the general purpose of this invention to provide a novel air spring pressure control valve device having a supply valve and a release valve which are actuated by any arcuate movement of a cam in one direction or in an opposite direction from a first neutral position to which the cam is shifted when the brakes are applied to stop the vehicle for the boarding or detraining of passengers, or by arcuate movement in the one or in the opposite direction in excess of a predetermined amount from a second neutral position to which the cam is shifted from the first neutral position upon effecting the release of the brakes subsequent to the boarding or detraining of the passengers.

SUMMARY OF THE INVENTION

According to the present invention, a novel air spring pressure control device mounted on a sprung portion of a vehicle for controlling the pressure in an air spring for interposition between the sprung portion and an unsprung portion of the vehicle comprises a supply valve and a release valve that are actuated respectively by arcuate movement of a cam in one direction or in an opposite direction. This cam is shiftable between two neutral positions. In one of these positions any arcuate movement of the cam in one direction or in an opposite direction respectively actuates the supply valve to effect the supply of fluid under pressure to the air spring or the release valve to effect the release of fluid under pressure therefrom, while in the other position a chosen degree of arcuate movement in the one direction or in the opposite direction is necessary to respectively actuate the supply valve or the release valve. The novel air spring pressure control valve device further comprises an abutment means which, when subject on one side to the fluid under pressure supplied for effecting a brake application on the vehicle, effects shifting of the cam from its other to its one neutral position. Therefore, while the brakes are released, limited movement of the sprung portion of the vehicle relative to the unsprung portion in response to the shocks, jolts, vertical movement, and sidewise rocking of the sprung portion, while the vehicle is traveling at a high speed, is ineffective to change the pressure in the air spring and therefore, the preselected height of the sprung portion relative to the unsprung portion.

In the accompanying drawings:

FIG. 1 is an elevational view, partly in section, of a control valve device embodying the invention shown associated with a sprung and an unsprung portion of a vehicle and a source of fluid supply.

FIG. 2 is an enlarged vertical sectional view of a control valve device of the type shown in outline in FIG. 1 and constituting a first embodiment of the invention, an operating arm shown in FIG. 1 being shown in phantom.

FIG. 3 is a sectional view taken along the line 3—3 of FIG. 2 and looking in the direction of the arrows.

FIG. 4 is an enlarged vertical sectional view of a control valve device of the type shown in outline in FIG. 1 and constituting a second embodiment of the invention, an operating arm being shown in phantom.

FIG. 5 is a sectional view taken along the line 5—5 of FIG. 4 and looking in the direction of the arrows.

DESCRIPTION — FIGS. 1, 2 AND 3

Figure 6:
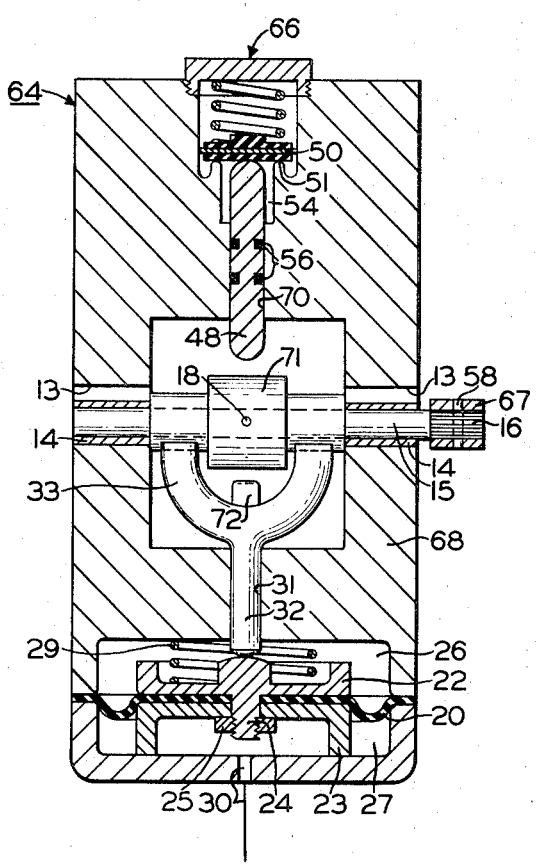

Referring to FIG. 1 of the drawings, a control valve device 1 embodying the invention is shown for controlling pressure of fluid in an air spring 2 that at its upper end operatively bears against a sprung portion, such as a bolster 3 of a railway vehicle, and at its lower end against an unsprung portion, such as a truck side frame 4, so as to cause the air spring 2 to maintain the sprung portion 3 at a substantially constant height above and relative to the unsprung portion 4. A casing 5 of the valve device 1 is provided with a pair of smooth bores 6 and 7 (FIG. 2) through which may pass such as, for example, a pair of cap screws 8 by which the casing 5 may be secured to the bolster 3.

As shown in FIGS. 2 and 3 of the drawings, the casing 5 is provided with a chamber 9, one side of which, as shown in FIG. 2, is open to the exterior of the casing in order that certain of the hereinafter described elements of the control valve device 1 may be placed in this chamber when assembling this device. In order to prevent the entrance of dirt, water, snow and other contaminants into the chamber 9, subsequent to assembly, the opening to the exterior of the casing 5 is closed by a resilient gasket 10, formed of, for example, rubber, and a cover 11 that is secured to the casing 5 by a pair of, for example, screws 12.

As best shown in FIG. 3, each of two opposite parallel walls of the chamber 9 is provided with an elongated slot 13, the width of each slot 13 being substantially the same as the diameter of a wear bushing or sleeve 14 that is disposed therein for slidable vertical movement between the upper and lower ends thereof. These bushings 14 are mounted, as by a press fit, in spaced-apart relationship on a shaft 15 that extends through the chamber 9 and the slots 13, the right-hand end of which shaft, as viewed in FIG. 3, is provided with external splines 16. Disposed in the chamber 9 and mounted on shaft 15 midway between the bushings 14 is a substantially heart-shaped cam 17 that is secured to the shaft 15 as by a pin 18 that has a press fit in coaxial bores provided therefor in the cam and shaft.

As shown in FIG. 3, a spacer 19 in the form of a sleeve is mounted on the shaft 15 between each of the bushings 14 and the respective adjacent side of the cam 17, it being noted that the length of these sleeves is the same as the distance between the adjacent side of the cam and the bushing and that the outside diameter of these sleeves is greater than the outside diameter of the bushings 14. Consequently, when the cam 17, spacers 19 and bushings 14 are assembled on the shaft 15 and within the chamber 9 and slots 13, the spacers 19 prevent longitudinal shifting of the shaft 15 in either direction along its axis.

In order to provide for vertical shifting of the shaft 15 and cam 17 from the position in which they are shown in FIGS. 2 and 3 in which the bushings 14 abut the lower end of the slots 13 to a position in which these bushings abut the upper end of these slots, a fluid motor now to be described is provided, it being understood that fluid under pressure is supplied to this motor whenever a brake application is effected on the vehicle and released therefrom whenever the brake application is subsequently released.

As shown in FIGS. 2 and 3, the outer periphery of a diaphragm or movable abutment 20 is clamped between the lower end of the casing 5 and a bottom cover 21 that is secured to the casing 5 by any suitable means (not shown). The inner periphery of the diaphragm 20 is clamped between a diaphragm follower 22 and an annular diaphragm follower plate 23 through which a screw-threaded stem 24 integral with the follower 22 extends to receive a nut 25 that has screw-threaded engagement with the stem 24.

The diaphragm 20 cooperates with the casing 5 and cover 21 to form on the respective opposite sides of this diaphragm two chambers 26 and 27. Disposed within the chamber 26, which is constantly open to atmosphere via a port 28 in the casing 5, and between the casing 5 and the diaphragm follower 22 is a spring 29 for biasing the diaphragm 20 and diaphragm follower plate 23 in a downward direction to the position shown in which plate 23 abuts the cover 21. The chamber 27 on the lower side of diaphragm 20 is connected by a passageway and corresponding pipe 30 to such as a brake cylinder device (not shown) for effecting a brake application on the vehicle.

The casing 5 is provided with a bore 83 extending between the chambers 9 and 26 in which bore is slidably disposed an operating member or rod 32 the lower end of which abuts the diaphragm follower 22. Integral with the upper end of the rod 32 and disposed in the chamber 9 is a yoke 33 the ends of which are provided with arcuate recesses for receiving therein the spacers 19 as is apparent from FIG. 3.

The control valve device 1 comprises a supply valve device 34 and an exhaust valve device 35 (FIG. 2).

The supply valve device 34 comprises a valve operating stem 36 that is slidably mounted within a bore 37 that extends from the chamber 9 through the casing 5 to a delivery chamber 38 therein. This delivery chamber 38 is connected to the interior of the air spring 2 (FIG. 1) by a passageway and correspondingly numbered pipe 39. The chamber 38 (FIG. 2) is open through an annular valve seat 40 to a supply chamber 41 formed by the cooperative relationship between the casing 5 and a screw-threaded plug 42 that has screw-threaded engagement with an integral screw-threaded counterbore 43 provided in the casing 5. Contained in the supply chamber 41 is a flat disc-type supply valve 44 which cooperates with the annular valve seat 40 to control communication between the chambers 38 and 41. Interposed between the upper face of the flat disc-type valve 44 and the plug 42 is a spring 45 for resiliently seating the valve 44 on the valve seat 40 to normally close communication between the chambers 41 and 38. The supply chamber 41 is connected by a passageway and correspondingly numbered pipe 46 to a supply reservoir 47 (FIG. 1). Therefore, the supply chamber 41 is always charged to the same pressure as is present in the reservoir 47, it being understood that this reservoir is charged with fluid under pressure by any suitable means (not shown).

The exhaust valve device 35 is very similar in construction to the supply valve device 34 and comprises a valve operating stem 48 slidably mounted in a bore 49 in the casing 5 for effecting unseating of a flat disc-type exhaust valve 50 from an annular valve seat 51 to establish a communication between a chamber 52 that is connected to the hereinbefore-mentioned passageway 39 by a passageway 53 and a chamber 54 that is open to atmosphere via a passageway 55 extending through the casing 5 from the chamber 54 to the exterior surface of this casing.

The hereinbefore-mentioned valve stems 36 and 48 are each provided substantially midway their ends with a peripheral annular groove in which is disposed an O-ring seal 56. The seal 56 carried by the stem 36 prevents leakage of fluid under pressure from the delivery chamber 38 to the chamber 9 and the seal 56 carried by the stem 48 prevents the entrance of contaminants into the chamber 9 via the bore 49.

In order to effect rocking of the hereinbefore-mentioned shaft 15 and cam 17 in one direction or in an opposite direction to cause this cam 17 to effect unseating of the valve 44 via the stem 36, or unseating of the valve 50 via the stem 48, one end of an operating member or arm 57 having at one end a bore provided with internal splines is secured to the splined end 16 of the shaft 15 by a pin 58. As shown in FIG. 1, the other end of the operating arm 57 is provided with a clevis in the opposite jaws of which is a bore for receiving one end of a pin 59 that operatively connects this arm 57 to one end of a link 60. The other end of this link 60 is pivotally connected to the truck side frame 4 by any suitable means such as, for example, a pin 61.

OPERATION

Assume initially that the brakes on the vehicle are released. Consequently, the chamber 27 is void of fluid under pressure so that the spring 29 is effective to bias the diaphragm follower 22, the diaphragm 20 and the diaphragm follower plate 23 to the position shown in FIGS. 2 and 3 in which the plate 23 abuts the bottom cover 21. With the diaphragm follower 22 biased by the spring 29 to the position shown in FIGS. 2 and 3, the force of gravity will maintain the rod 32, yoke 33, shaft 15 and cam 17 in the position shown in which the bushings 14 abut the lower end of the slots 13 and the spacers 19 are supported by the yoke 33.

Also, assume initially that there is sufficient fluid under pressure present in the air spring 2 so that the sprung portion or bolster 3 of the vehicle is supported at the desired preselected height relative to the unsprung portion or truck side frame 4. Consequently, as shown in FIG. 2, (1) the supply valve 44 is seated on its seat 40 by the spring 45 so that the operating stem 36 occupies the position shown, and (2) the exhaust valve 50 is seated on its seat 51 by a spring 63 so that the operating stem 48 occupies the position in which it is shown. Therefore, the supply pipe 46 is cut off from the delivery pipe 39 and this delivery pipe is cut off from the chamber 54 which is open to atmosphere via passageway 55.

As can be seen from FIG. 2, the lower end of the valve operating stems 36 and 38 are disposed a short distance away from the peripheral surface of the cam 17.

Accordingly, should any relative movement between the sprung and unsprung parts of the vehicle occur as the result of shocks, jolts, vertical movement or sidewise rocking of the sprung parts, that is the bolster 3 and the control valve device 1 supported thereon, while the vehicle is traveling at high speed, it is apparent from FIG. 1 that this movement causes a change in the height of the sprung part (bolster 3 and valve device 1) relative to the unsprung part (truck side frame 4). It is further apparent from FIGS. 1, 2 and 3 that because the operating arm 57 is splined at one end to the shaft 15 and pivotally connected at its opposite end to the upper end of the link 60 the lower end of which is operatively connected to the truck side frame 4 by the pin 61, any relative movement of the bolster 3 and control valve device 1 relative to the truck side frame 4 will cause rocking of the shaft 15 in one direction or in an opposite direction accordingly as this movement be such as to increase or decrease the distance between the sprung and unsprung parts of the vehicle. Therefore, it may be seen from FIG. 2 that a limited amount of either clockwise or counterclockwise rocking of the operating arm 57 (shown in phantom in FIG. 2), shaft 15 and cam 17 can occur in response to shocks, jolts, etc. without the cam 17 being rocked to a position in which the supply valve 44 would be unseated from its seat 40 by the stem 36, or to a position in which the exhaust valve 50 would be unseated from its seat 51 by the stem 48. Consequently, no fluid under pressure would be supplied to or released from the interior of the air spring 2.

However, should the pressure in the air spring 2 be reduced to a chosen degree as a result of leakage of fluid under pressure therefrom while the vehicle is traveling with the brakes released, the resulting vertical downward movement of the bolster 3 and control valve device 1 relative to the truck side frame 4 will be great enough to effect sufficient clockwise rocking of shaft 15 and cam 17, as viewed in FIG. 2, to cause the surface of this cam 17 to be moved first into contact with the lower end of the valve operating stem 36 and thereafter move this stem in the direction to cause it to unseat supply valve 44 from its seat 40.

Upon the unseating of valve 44 from its seat 40, fluid under pressure will flow from the supply reservoir 47 to the interior of the air spring 2 via pipe and passage 46, chamber 41, past unseated valve 44, chamber 38 and passageway and pipe 39. As fluid under pressure is thus supplied to the interior of the air spring 2 to increase the pressure therein, the bolster 3 and valve device 1 will be moved vertically upward and, through the medium of the link 60 and operating arm 57, effect rocking of the shaft 15 and cam 17 counterclockwise, as viewed in FIG. 2, so that the cam 17 is moved away from the stem 36. As the cam 17 is thus moved away from the stem 36, the spring 45 is rendered effective to seat the supply valve 44 on its seat 40 to cut off further flow of fluid under pressure from the supply reservoir 47 to the interior of the air spring 2, it being noted that movement of the valve 44 into seating contact with its seat 40 effects movement of the stem 36 within the bore 37 to the position shown in FIG. 2.

Moreover, should the pressure in the air spring 2 be increased from any cause to a second chosen degree while the vehicle is traveling with the brakes released, it is apparent from FIGS. 1 and 2 that the resulting vertical upward movement of the bolster 3 and control valve device 1 relative to the side frame 4 will be great enough to effect sufficient counterclockwise rocking of shaft 15 and cam 17, as viewed in FIG. 2, to cause the valve stem 48 to unseat exhaust valve 50 from its seat 51. Upon this unseating of valve 50, fluid under pressure present in the interior of the air spring 2 will flow to atmosphere via pipe and passageway 39, passageway 53, chamber 52, past unseated valve 50, chamber 54 and passageway 55.

This release of fluid under pressure from the interior of the air spring 2 will result in vertical downward movement of the bolster 3 and control valve device 1 whereupon the link 60 and operating arm 57 effect clockwise rocking of the shaft 15 and cam 17, as viewed in FIG. 2, so that the cam 17 is moved away from the stem 48. The spring 63 will then effect seating of exhaust valve 50 on its seat 51 to terminate the release of fluid under pressure from the interior of the air spring 2 and cause movement of the valve stem 48 within the bore 49 to the position shown in FIG. 2.

From the foregoing, it is apparent that should a predetermined increase or decrease in the pressure of the fluid in the interior of the air spring 2 occur while the vehicle is traveling with its brakes released, the control valve device 1 is automatically operative to establish a pressure in the interior of the air spring 2 that will cause the bolster 3 and control valve device 1 to be maintained in one or the other of two positions relative to the sprung portion or truck side frame 4, it being noted that while in either of these two positions, the distance between the bolster 3 and the truck side frame 4 differs from the hereinbefore-mentioned preselected height by a certain chosen amount determined by the design parameters of the control valve device 1.

Prior to stopping the vehicle for the boarding or detraining of passengers, or otherwise changing the load on the vehicle body that is supported by the bolster 3, the operator of the vehicle will effect a brake application thereon by causing the supply of fluid under pressure to some suitable fluid pressure operated means such as, for example, a brake cylinder device (not shown). As hereinbefore-mentioned, the pipe 30 is connected to this brake cylinder device. Consequently, some of the fluid under pressure supplied to this brake cylinder device flows to the chamber 27 (FIGS. 2 and 3) via the pipe and passageway 30.

Fluid under pressure thus supplied to the chamber 27 in the manner described above will act upward on the effective area of the diaphragm 20 to deflect it in an upward direction and move the diaphragm follower 22, rod 32 and yoke 33 upward until the follower 22 abuts the casing 5.

As the yoke 33 is thus moved upward, it is apparent from FIGS. 2 and 3 that the shaft 15, on which is mounted the bushings 14, spacers 19 and cam 17, is likewise moved upward until the bushings 14 abut the upper end of the slots 13 in the casing 5. This upward movement of the shaft 15 is just sufficient to shift the cam 17 from the position in which it is shown in FIG. 2 to a position in which the peripheral surface of this cam makes contact with the lower end of each of the valve operating stems 36 and 48 without effecting movement of these stems to cause unseating of the respective valves 44 and 50 from their seats.

If now, while the vehicle is stopped and the brakes applied, the load on the sprung portion of the vehicle is increased as the resulting of, for example, the boarding of passengers, the bolster 3 and control valve device 1 will begin to move vertically downward, as viewed in FIG. 1, relative to the truck side frame 4 from the aforementioned preselected height above the side frame. As the control valve device 1 thus begins to move downward, the shaft 15 and cam 17 will begin to be rocked clockwise, as viewed in FIG. 2.

Since the fluid under pressure previously supplied to chamber 27 has moved the shaft 15 and cam 17 to the position in which the periphery of this cam is in contact with the lower end of the valve stems 36 and 48, it is apparent that the initial clockwise rocking, as viewed in FIG. 2, of the cam 17 is effective to shift the valve operating stem 36 in the bore 37 in the direction to cause unseating of the supply valve 44 from its seat 40.

Upon the unseating of valve 44, fluid under pressure will flow from the supply reservoir 47 (FIG. 1) to the interior of the air spring 2 via the pathway hereinbefore described. As the pressure in the interior of the air spring 2 is thus increased, the control valve device 1, bolster 3 and the vehicle body supported thereon will be moved vertically upward whereupon the shaft 15 and cam 17 will be rocked counterclockwise, as viewed in FIG. 2, in the manner hereinbefore described.

This counterclockwise rocking of the cam 17 renders the spring 45 effective to reseat the valve 44 on its seat 40 thereby cutting off flow of fluid under pressure from the reservoir 47 to the interior of the air spring 2, it being noted that as the valve 44 is moved to its seated position shown in FIG. 2, it is effective to shift the stem 36 downward within the bore 37 so that the lower end of this stem remains in contact with the periphery of the cam 17.

From the foregoing, it is apparent that as the load on the vehicle increases as the result of the boarding of passengers while the vehicle is stopped, the control valve device 1 is automatically operatively responsive to this increase in load to effect the supply of fluid under pressure to the interior of the air spring 2 whereby the resulting increase of the pressure of the fluid in the air spring 2 maintains the sprung portion of the vehicle at the desired preselected height relative to the unsprung portion notwithstanding the increase in the load on the sprung portion.

If, while the vehicle is stopped and the brakes are applied, the load on the sprung portion is decreased as the result of, for example, detraining of passengers, the bolster 3 and valve device 1 will beging to move vertically upward, as viewed in FIG. 1, relative to the truck side frame 4 from the aforementioned preselected height above the side frame. As control valve device 1 begins to move upward, the shaft 15 and cam 17 will begin to be rocked counterclockwise, as viewed in FIG. 2.

This initial counterclockwise rocking of the cam 17 is effective to shift the valve operating stem 48 in the bore 49 in the direction to effect unseating of the exhaust valve 50 from its seat 51.

Upon the unseating of exhaust valve 50, fluid under pressure will be released from the interior of the air spring 2 (FIG. 1) to atmosphere, via pipe and passageway 39, passageway 53 (FIG. 2), chamber 52, past unseated valve 50, chamber 54 and passageway 55.

As the fluid under pressure in the interior of the air spring 2 is released to atmosphere, the pressure therein is decreased. Consequently, the bolster 3 and valve device 1 will begin to move vertically downward in response to the decrease in the pressure of the fluid in the air spring 2 whereupon the shaft 15 and cam 17 will be rocked clockwise, as viewed in FIG. 2, to render spring 63 effective to seat exhaust valve 50 on its seat 51 and return valve stem 48 to the position shown. This seating of exhaust valve 50 terminates the release of fluid under pressure from the interior of the air spring 2 to atmosphere.

From the foregoing, it is readily understood that as the load on the vehicle is decreased as the result of detraining of passengers, the control valve device 1 is automatically operatively responsive to this decrease in load to effect a release of fluid under pressure from the interior of the air spring 2 to atmosphere whereby the air spring 2 is rendered effective to maintain the sprung portion of the vehicle at the desired preselected height relative to the unsprung portion notwithstanding the decrease in the load on the sprung portion.

It will be noted from FIG. 2 that the heart-like shape of the cam 17 will allow the upper or pointed end of the cam to pass the lower end of the valve operating stems 36 and 48 if the operating arm 57 and shaft 15 are rocked in either direction through more than a certain angle. Therefore, should a rupture of the pipe 39 or the air spring 2 occur, or leakage between the supply valve 44 and its seat 40 increase the pressure in the interior of the air spring 2 to an abnormally high value, either of which would effect rocking of shaft 15 and cam 17 through more than the above-mentioned certain angle, no damage or breakage of the parts of the control valve device 1 would result therefrom.

Moreover, it should be noted that by the provision of the external splines 16 (FIG. 3) on the right-hand end of shaft 15 and the internal splines in the bore adjacent one end of the operating arm 57, this arm 57 may be secured to the shaft 15 in any of a plurality of positions after which a bore is drilled in the splined end 16 of the shaft 15 for receiving the pin 58. This construction enables mounting the control valve device 1 on the sprung portion of the vehicle in the most convenient of a plurality of positions.

DESCRIPTION - FIGS. 4 AND 5

In FIGS. 4 and 5 of the drawings, there is shown a control valve device 64 constructed in accordance with a second embodiment of the invention. According to this second embodiment of the invention, the control valve device 64 differs from the control valve device 1 in that a pair of supply and release valve devices 65 and 66 are disposed in a parallel spaced-apart relationship, and an operating arm 67, which corresponds to the operating arm 57 shown in FIGS. 2 and 3, is constructed of a suitable resilient material such as, for example, spring steel. Accordingly, like reference numerals have been used to designate the structure shown in FIGS. 4 and 5 which is identical to that shown in FIGS. 1, 2 and 3. Only such features of the structure and operation of the embodiment of the invention shown in FIGS. 4 and 5 which differ from that of the embodiment of FIGS. 1, 2 and 3 will be hereinafter described.

According to the embodiment of the invention disclosed in FIGS. 4 and 5, the control valve device 64 comprises a casing 68 provided with a pair of parallel spaced-apart smooth bores 69 and 70 in which are slidably mounted the stems 36 and 48 that respectively control the seating and unseating of the supply valve 44 of the supply valve device 65 and the release valve 50 of the release valve device 66 in accordance with the direction of rocking of a cam 71 that is mounted on the shaft 15 by means of the pin 18 in place of the cam 17 of the control valve device 1.

In order to limit the rocking of the cam 71 in each direction, the casing 68 has formed integral therewith a pair of spaced-apart stops 72 and 73 that extend into the chamber 9, as shown in FIG. 4. These stops 72 and 73 prevent the rotation of the opposite ends of the cam 71 past the lower end of the valve operating stems 36 and 48.

It should be understood that the control valve device 64 is mounted on a sprung part of the vehicle, such as the bolster 3 shown in FIG. 1, in place of the control valve device 1, and the left-hand end, as viewed in FIG. 4, of the operating arm 67 is pivotally connected to one end of the link 60 (FIG. 1) the opposite end of which is operatively connected to the truck side frame 4. Therefore, should a rupture of the pipe 39 or the air spring 2 occur, which would allow the bolster 3 and the control valve device 64 to move vertically downward until the bolster rested on metallic coil springs (not shown), the resilient material, such as spring steel, of which the operating arm 67 is constructed would provide, subsequent to the cam 71 striking the stop 72, for the bending or flexing of this arm 67 from the position indicated in FIG. 3 by the reference numeral 74 to the position indicated by the reference numeral 75. Therefore, no damage or breakage of the parts of the control valve device 64 would result from a rupture of the pipe 39 or the air spring 2.

Should leakage occur between the supply valve 44 (FIG. 4) and its seat 40 so that the resulting abnormally high pressure in the interior of the air spring 2 moved the bolster 3 and the control valve device 64 vertically upward from the position in which the sprung portion is supported at the preselected height relative to the unsprung portion or truck side frame 4, the resulting initial counterclockwise rocking of the shaft 15 and cam 71 if a brake application is in effect, or the counterclockwise rocking of the shaft 15 and cam 71 through an angle greater than a certain chosen angle if the brakes are released, would shift valve operating stem 48 upward to effect unseating of the exhaust valve 50 from its seat 51 to release fluid under pressure from the interior of the air spring 2 to atmosphere until the sprung portion returned to the position in which it is supported to the preselected height above the unsprung portion. Thus, the control valve device 64 is automatically operative to maintain the sprung portion at substantially the preselected height above the unsprung portion notwithstanding undesired leakage of fluid under pressure between the supply valve 44 and its seat 40.

Having now described the invention what I claim as new and desire to secure by Letters Patent, is:

1. A control valve device for so controlling the pressure of a fluid in an air spring for interposition between a sprung portion and an unsprung portion of a vehicle as to support the sprung portion at a substantially constant preselected height above the unsprung portion irrespective of the load carried by the sprung portion, said control valve device comprising:
    a. a casing for attachment to the sprung portion,
    b. a supply and release valve mechanism mounted in said casing having a pair of valve operating stems for effecting respectively the operation of the valve mechanism to cause the supply of fluid under pressure to and the release of fluid under pressure from the air spring to control the pressure therein,
    c. a movable cam rockably carried within said casing for effecting movement in one direction of one or the other of said pair of valve operating stems accordingly as said cam is rocked in one direction or in an opposite direction,
    d. fluid pressure operated motor means for effecting movement of said movable cam from a first position in which a chosen degree of rocking of said cam in said one direction or in said opposite direction is required prior to effecting movement of the corresponding valve stem to a second position in which any degree of rocking of said cam in said one direction or in said opposite direction effects movement of the corresponding valve stem,
    e. cam actuator means for controlling rocking of said cam in either of said directions, and
    f. a linkage for operatively connecting the unsprung portion of the vehicle with said cam actuator means and movable responsively to an increase in load on the sprung portion to cause said cam actuator means to rock said cam, while in either of its said positions, in said one direction to effect movement of one of said valve operating stems in the direction to operate said valve mechanism to supply fluid under pressure to the air spring, and to a decrease in load on the sprung portion to cause said cam actuator means to rock said cam, while in either of its said positions, in said opposite direction to effect movement of the other of said valve operating stems in the direction to operate said valve mechanism to release fluid under pressure from the air spring.

2. A control device, as recited in claim 1, further characterized in that said casing is provided with a chamber having a pair of parallel spaced-apart walls in each of which is an elongated slot, and said cam actuator means comprises:
    a. a shaft extending through said chamber and said elongated slots and having one end connected to said linkage, said shaft carrying thereon within said chamber said cam, and
    b. a pair of spaced-apart sleeves each carried on said shaft and disposed within one of said elongated slots in said casing whereby, while said sleeves abut one end of said slots, said cam carried on said shaft is disposed in its said first position, and, while said sleeves abut the other end of said slots, said cam is disposed in its said second position.

3. A control valve device, as recited in claim 1, further characterized in that said supply and release valve mechanism comprises:

a. an annular supply valve seat coaxially arranged with respect to one of said valve operating stems, b. a supply valve for cooperation with said supply valve seat to control the supply of fluid under pressure to the air spring in accordance with the movement of said one valve operating stem in response to rocking of said cam in said one direction, c. an annular exhaust valve seat coaxially arranged with respect to the other of said valve operating stems, d. an exhaust valve for cooperation with said exhaust valve seat to control the release of fluid under pressure from the air spring to atmosphere in accordance with the movement of said other valve operating stem in response to rocking of said cam in said opposite direction, and e. means for resiliently biasing each of said valves against its respective valve seat and the valve operating stem therefor to a corresponding position in which one end of said operating stem is disposed out of or into contact with said movable cam accordingly as said cam is disposed in its said first or in its said second position whereby, while said cam is in its said first position, the rocking of said cam in either of said directions in response to limited movement of the sprung portion of the vehicle relative to the unsprung portion caused by shocks and jolts while the vehicle is traveling at a substantial speed, is ineffective to cause unseating of either valve by its respective operating stem to effect a change of the pressure within the air spring.

4. A control valve device, as recited in claim 1, further characterized in that the axis of each of said valve operating stems forms substantially a right angle with the axis of the other stem.

5. A control valve device, as recited in claim 1, further characterized in that the axis of each of said valve operating stems is substantially parallel to the axis of the other stem.

6. A control valve device, as recited in claim 1, further characterized in that said cam has substantially the shape of a heart having an apex, and said cam is so rockably mounted that, upon an excessive change of pressure in the air spring, the resulting abnormal degree of movement of the sprung portion of the vehicle relative to the unsprung portion rocks said cam sufficiently in said one direction or in said opposite direction to move said apex past one end of one or the other of said valve operating stems thereby preventing damage to said stems.

7. A control valve device, as recited in claim 2, further comprising:
a. a pair of spacers each carried on said shaft and disposed between one side of said cam and one of said sleeves, and
b. an operating member having a yoke at one end for supporting said pair of spacers thereon, said member being interposed between said spacers and said fluid pressure operated motor means and effective to cause movement of said cam from its said first position to its said second position in response to the supply of fluid under pressure to said motor means.

8. A control valve device, as recited in claim 2, further characterized in that said linkage comprises:
a. a rigid link for pivotal connection at one end to the unsprung portion of the vehicle, and
b. a resilient operating member pivotally connected at one end to the other end of said rigid link and rigidly connected at its opposite end to said shaft whereby, upon an excessive change of pressure in the air spring, said resilient operating member is flexed in response to the resulting abnormal degree of movement of the sprung portion relative to the unsprung portion thereby preventing damage to said operating stems by said cam.

9. A control valve device, as recited in claim 8, further characterized in that said casing is provided with a pair of spaced-apart stops integral therewith for respectively limiting the rocking of said cam in said one direction and in said opposite direction whereby said resilient operating member is flexed in one direction or in an opposite direction in response to the abnormal movement of the sprung portion subsequent to rocking of said cam into abutting relationship with one or the other of said stops.

10. A control valve device, as recited in claim 8, further characterized in that the shape of said cam constitutes substantially one-half of an ellipse disposed on one side of its major axis, and said cam is rockably mounted substantially midway the ends of said major axis.

* * * * *